(12) United States Patent
Okamoto et al.

(10) Patent No.: US 10,748,580 B2
(45) Date of Patent: Aug. 18, 2020

(54) INFORMATION PROCESSING APPARATUS

(71) Applicant: Panasonic Intellectual Property Management Co., Ltd., Osaka (JP)

(72) Inventors: Wataru Okamoto, Osaka (JP); Masafumi Sato, Osaka (JP); Hideaki Hatanaka, Kyoto (JP); Yoshikazu Sakai, Nara (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 0 days.

(21) Appl. No.: 16/181,542

(22) Filed: Nov. 6, 2018

(65) Prior Publication Data

US 2019/0139578 A1 May 9, 2019

(30) Foreign Application Priority Data

Nov. 9, 2017 (JP) .................................. 2017-216384

(51) Int. Cl.
*G11B 27/34* (2006.01)
*H04N 5/232* (2006.01)
*G11B 27/30* (2006.01)

(52) U.S. Cl.
CPC .......... *G11B 27/34* (2013.01); *G11B 27/3081* (2013.01); *H04N 5/23219* (2013.01); *H04N 5/232933* (2018.08)

(58) Field of Classification Search
CPC ........................... G11B 27/34; H04N 5/232933
See application file for complete search history.

(56) References Cited

U.S. PATENT DOCUMENTS

| | | | |
|---|---|---|---|
| 2004/0202456 | A1 | 10/2004 | Sasagawa |
| 2005/0044489 | A1* | 2/2005 | Yamagami .......... G11B 27/034 715/243 |
| 2011/0249861 | A1* | 10/2011 | Tokutake ............. G11B 27/105 382/103 |
| 2016/0344933 | A1 | 11/2016 | Mukai |
| 2018/0190325 | A1 | 7/2018 | Hayashi |

FOREIGN PATENT DOCUMENTS

| | | |
|---|---|---|
| JP | 2004-312495 A | 11/2004 |
| JP | 2013-126113 A | 6/2013 |
| JP | 2016-032214 A | 3/2016 |
| WO | 2017/029849 A1 | 2/2017 |

\* cited by examiner

*Primary Examiner* — Girumsew Wendmagegn
(74) *Attorney, Agent, or Firm* — Renner, Otto, Boisselle & Sklar, LLP

(57) ABSTRACT

An information processing apparatus includes a display, an operation receiver, a storage, and a controller. The operation receiver receives an instruction indicating a switch of a candidate image from a user. The storage stores movie data. The controller controls the display to display a selection screen via which a frame image to be stored as a still image is selected from the movie data. The selection screen includes the candidate image, first marker information, and second maker information. The controller moves a frame position of the candidate image based on the position indicated by the first marker information or the second marker information in a case where the operation receiver receives the instruction.

5 Claims, 13 Drawing Sheets

INFORMATION PROCESSING APPARATUS

BACKGROUND

1. Technical Field

The present disclosure relates to an information processing apparatus.

2. Related Art

There are imaging apparatuses that clips a frame image from a movie and records the frame image as a still image. For example, Japanese Unexamined Patent Application Publication No. 2016-32214 discloses an imaging apparatus that takes a movie in a mode suitable for a still image and clips a frame image from the movie taken to generate still image data. This configuration allows an image capturing a decisive moment to be generated without being sensitive to a shutter opportunity, the generation of such an image being difficult in a conventional technique.

When clipping a frame image from a movie to generate a still image, a user needs to select a desired frame image to be clipped. However, the movie is composed of a large number of: frame images. Thus, selecting a desired image from among the large number of frame images is a heavy burden on the user. For example, when a movie is taken at 60 fps for 10 seconds, the user has to select a desired frame image from among 600 frame images. Therefore, a user interface (UI) that allows the user to efficiently select a desired frame image has been required.

Japanese Unexamined Patent Application. Publication No. 2004-312495 discloses an image processing apparatus capable of easily clipping a peripheral image of a scene a user likes from a movie and recording the peripheral image. In the apparatus disclosed in Japanese Unexamined Patent Application Publication No, 2004-312495, the movie is played back and displayed in the "movie display area" of a liquid crystal monitor. A menu/OK button is pushed during playback of the movie to issue a still image extraction command. Then a predetermined number of frames of still image data obtained immediately before, immediately after, and before and after the moment when the still image extraction command is input is extracted from the movie data at predetermined intervals. The predetermined number of frames of the still image data is extracted together with still image data obtained at the moment when the still image extraction command is input. Then, the predetermined number of frames of the still image data is played back and displayed in the "still image display area" of the liquid crystal monitor and recorded as a still image file in a memory card.

In addition, Japanese Unexamined Patent Application Publication No. 2013-126113 discloses a mechanism capable of extracting images having scenes with impacts, distinctive scenes, and the like from a movie and collecting the images so that contents of the movie can be grasped at a glance. The information processing apparatus disclosed in Japanese Unexamined Patent Application Publication No. 2013-126113 receives, when extracting still image from a movie, selection of a template in which what kind of data should be taken into account and extracted is set, and extracts the still image based on the extraction condition set in the template selected for a movie from which the still image is to be extracted.

SUMMARY

According to one aspect of the present disclosure, an information processing apparatus includes a display, an operation receiver, a storage, and a controller. The operation receiver receives an instruction indicating a switch of a candidate image from a user. The storage stores movie data from which still image data is generated. The controller controls the display to display a selection screen via which a frame image to be stored as a still image is selected from the movie data. The selection screen includes the candidate image that is displayed as a candidate for a frame image to be selected. The selection screen includes first marker information indicating a position of a frame marked by the user in a plurality of frames composing the movie data. The selection screen includes second marker information indicating a position of a frame marked automatically based on a feature in the plurality of frames composing the movie data. The controller moves a frame position of the candidate image based on the position indicated by the first marker information or the second marker information in a case where the operation receiver receives the instruction.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings.

DESCRIPTION OF THE EMBODIMENTS

Figure 1:
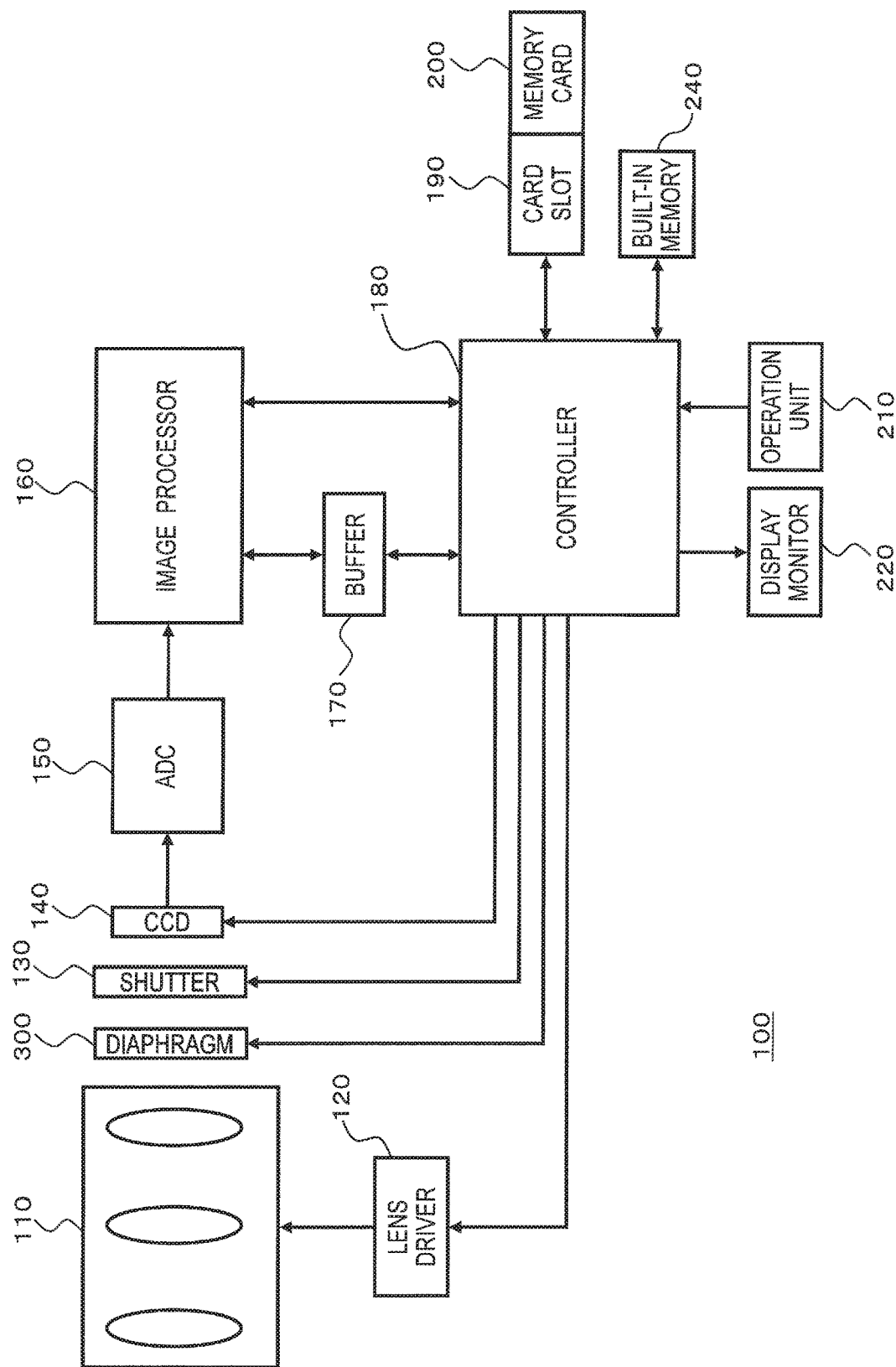
FIG. 1 is a block diagram showing an internal configuration of a digital camera of the present disclosure.

The embodiments will now be described with reference to the accompanying drawings, wherein like reference numerals designate corresponding or identical elements throughout the various drawings.

Embodiments will be described in detail below with appropriate reference to the drawings. However, a detailed description more than necessary may be omitted. For example, a detailed description of a well-known matter and a redundant description on substantially the same configuration may be omitted. This is to avoid the following description being unnecessarily redundant and to help those skilled in the art to easily understand the following description. Note that the inventors provide the attached drawings and the following description to help those skilled in the art to fully understand the present disclosure, and do not intend to use the attached drawings and the following description to limit the subject matter of the claims.

First Embodiment

Hereinafter, a configuration and an operation of a digital camera corresponding to one embodiment of an information processing apparatus according to the present disclosure will be described with reference to the drawings.

[1. Configuration]

1. Configuration of Digital Camera

An example of an electrical configuration of the digital camera according to the first embodiment will be described with reference to FIG. 1. FIG. 1 is a block diagram Showing a configuration of a digital camera 100. The digital camera 100 is an imaging apparatus that causes a charge-coupled device (COD) 140 to take a picture of a subject image formed by an optical system 110 including one or more lenses. The digital camera 100 may be either a lens-interchangeable camera or a lens-integrated camera.

Image data generated by the COD 140 is subjected to various kinds of processing in an image processor 160 and stored in a memory card 200. A description will be given in detail below of the configuration of the digital camera 100.

The optical system 110 includes a zoom lens and a focus lens. Moving the zoom lens along an optical axis allows the subject image to be enlarged or reduced. Further, moving the focus lens along the optical axis allows a focus on the subject image to be adjusted.

A lens driver 120 drives various lenses included in the optical system 110. The lens driver 120 includes, for example, a zoom motor that drives the zoom lens and a focus motor that drives the focus lens.

A diaphragm 300 varies, automatically or in accordance with a user setting, a size of an aperture through which light travels to regulate an amount of light that travels therethrough.

A shutter 130 is a unit for shielding light which is transmitted in the COD 140. The shutter 130 together with the optical system 110 and the diaphragm 300 constitute an optical system unit that controls optical information indicating the subject image.

The CCD 140 takes a picture of the subject image formed the optical system 110 and generates image data. The CCD 140 includes color filter, a light receiving element, and an auto gain controller (AGC). The light receiving element converts an optical signal condensed by the optical system 110 into an electric signal to generate image information. The AGO amplifies the electric signal output from the light receiving element. The CCD 140 further includes a drive circuit and the like for various operations such as exposure, transfer, and electronic shutter. Details will be described later. Although the CCD 140 has been illustrated as an image sensor, another type of image sensor such as a complementary metal oxide semiconductor (CMOS) image sensor or a N-channel metal oxide semiconductor (NMOS) image sensor may be used.

An analog-to-digital converter (ADO) 150 converts analog image data generated by the CCD 140 into digital image data.

The image processor 160 performs, under control of a controller 180, various kinds of processing on the digital image data that is generated by the CCD 140 and is converted. The image processor 160 generates image data to be displayed on a display monitor 220 and generates image data to be stored in the memory card 200. For example, the image processor 160 performs various kinds of processing such as gamma correction, white balance correction, and flaw correction on the image data generated by the COD 140. Further, the image processor 160 compresses the image data generated by the CCD 140 in a compression format and so on that conforms to H.264 standard or MPEG 2 standard. The image processor 160 may be implemented by a digital signal processor (DSP), a microcomputer, or the like. Further, the image processor 160 is capable of generating movie data (4K movie data) having approximately 4000*2000 pixels based on the image data generated by the CCD 140. The image processor 160 is capable of performing various kinds of processing described later on the 4K movie data generated.

The controller 180 is a control unit that controls a whole of the digital camera 100. The controller 180 may implemented by a semiconductor element or the like. The controller 180 may be implemented only by hardware, or may be implemented by a combination of hardware and software. The controller 180 may be implemented by a microcomputer, a central processing unit (CPU), a micro processing unit (MPU), an application specific integrated circuit (ASIC), a field programmable gate array (FPGA), or the like.

A buffer 170 serves as a work memory of the image processor 160 and the controller 180. The buffer 170 may be implemented by, for example, a dynamic random access memory (DRAM), a ferroelectric memory, or the like.

A card slot 190 detachably accepts the memory card 200. The card slot 190 is mechanically and electrically connectable to the memory card 200.

The memory card 200 includes a flash memory, a ferroelectric memory, or the like therein, and is capable of storing data such as an image file generated by the image processor 160.

A built-in memory 240 includes a flash memory, a ferroelectric memory, or the like. The built-in memory 240 stores a control program and the like for controlling the whole of the digital camera 100.

An operation unit 210 is a generic term for user interfaces that receive operations from a user. The operation unit 210 corresponds to, for example, a selection button or a determination button that receives an operation from the user.

The display monitor 220 is capable of displaying an image (a through image) represented by the image data generated by the CCD 140 and an image represented by the image data read from the memory card 200. The display monitor 220 is further capable of displaying various menu screens and the like for various settings of the digital camera 100. The display monitor 220 is a liquid crystal display device or an organic electro-luminescence (EL) display device.

Figure 2:
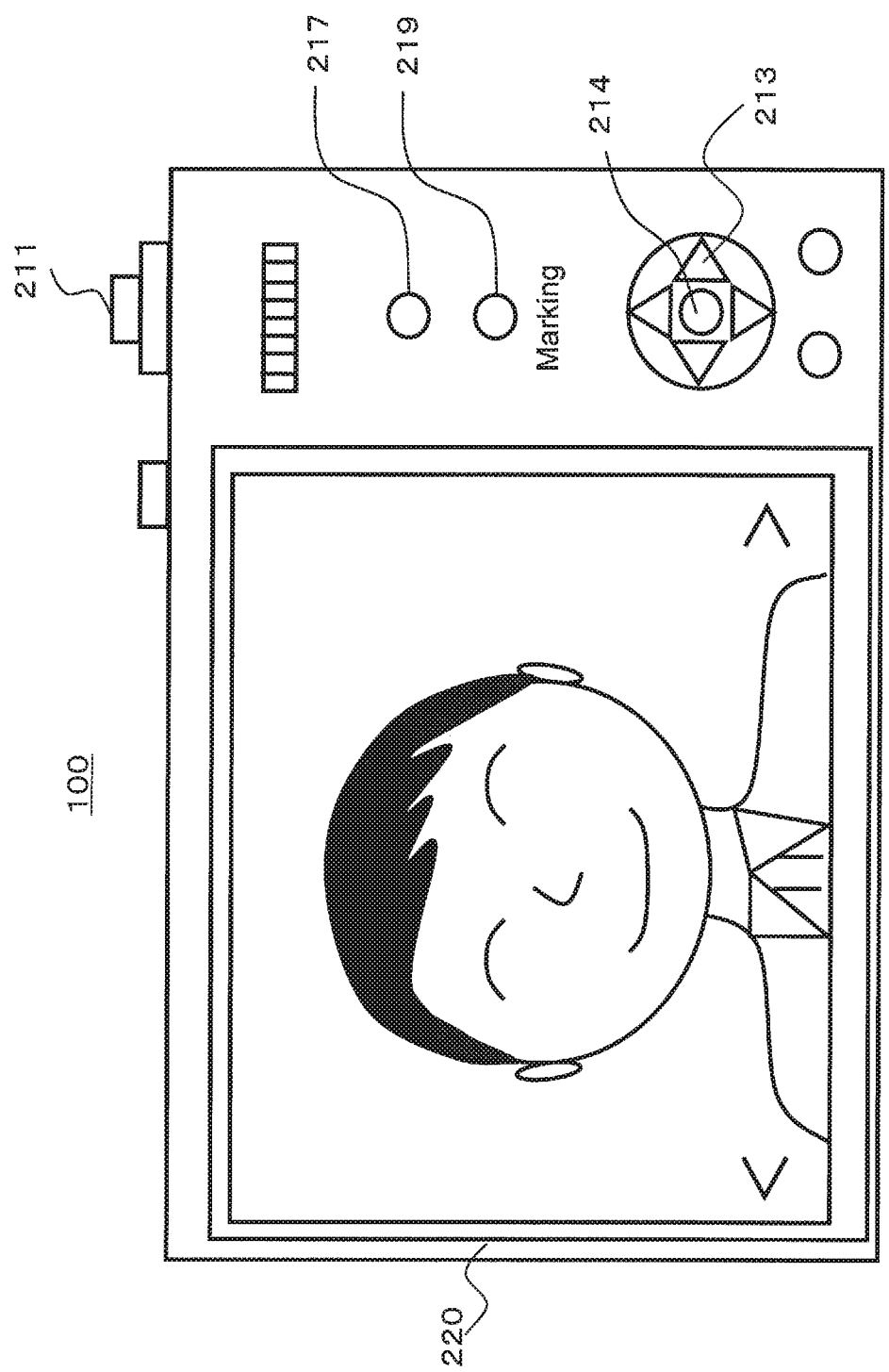
FIG. 2 is a diagram showing a rear side of the digital camera of the present disclosure.

FIG. 2 is a diagram showing a rear side of the digital camera 100. The operation unit 210 includes a button, a lever, a dial, and a member that receives an operation made by the user. For example, as shown in FIG. 2, the operation unit 210 includes a release button 211, a cursor button 213, a determination button 214, a movie-record button 217, and the like. Upon receiving operations made by the user, the operation unit 210 transmits various instruction signals to the controller 180. Further, the operation unit 210 includes a touch panel placed on the display monitor 220, and is capable of receiving a touch operation made by the user on an icon, a button, or the displayed on the display monitor 220.

The release button 211 is a two-step push button. When the release button 211 is pushed halfway by the user, the controller 180 performs autofocus control (AF control), auto exposure control (AE control), or the like. Further, when the release button 211 is fully pushed by the user, the controller 180 records image data taken at the timing of the push operation as a recording image in the memory card 200 or the like.

The cursor button 213 is a push button including direction buttons directed in up, down, left, and right directions. The user can push any one of the direction buttons of the cursor button 213 to move a cursor or select one from among various condition items displayed on the display monitor 220.

The determination button 214 is a push button. When the determination button 214 is pushed by the user with the digital camera 100 in a shooting mode or a playback mode, the controller 180 displays a menu screen on the display monitor 220. The menu screen is a screen for settings of various conditions for shooting and playback. When the determination button 214 is pushed with a setting item of the various conditions selected, the controller 180 enables a setting of the item selected.

[2. Operation]

A description will be given of the operation of the digital camera 100 configured as described above. The digital camera 100 is capable of taking a picture of a subject to generate movie data and still image data. The movie data and the still image data are stored in the memory card 200 in the digital camera 100. Data in the memory card 200 can be transferred from the digital camera 100 to the PC accordance with an instruction from the user.

[2-1. 4K Photo Mode]

As a drive mode for taking a still image, the digital camera 100 has a single shooting mode for taking an image one at a time, a consecutive shooting mode for taking a plurality of images consecutively in response to a single operation, and a 4K photo mode. The 4K photo mode is a mode for taking a high definition movie with a high resolution such as 4K or 6K (hereinafter, referred to as "4K photo movie"). After taking the 4K photo movie, a still image can be generated from a desired frame clipped from a group of frames composing the 4K photo movie (see, for example, Japanese Unexamined Patent Application Publication No. 2016-32214).

Figure 3:
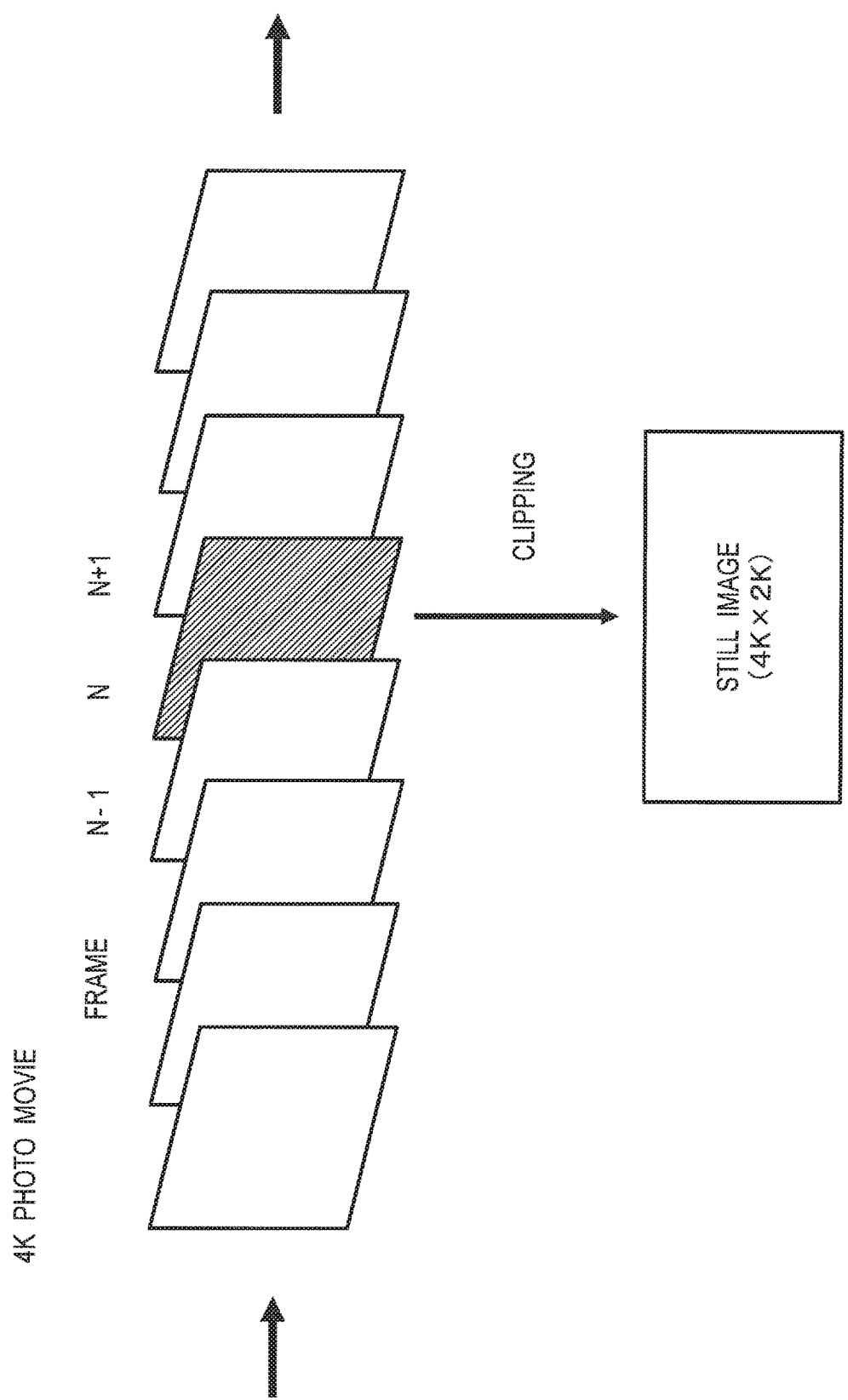
FIG. 3 is a diagram for describing a 4K photo mode.

FIG. 3 is a diagram for describing the generation of a still image from a 4K photo movie. The 4K photo movie is composed of a plurality of frame images that are temporally continuous. The still image data can be generated from a desired frame image clipped from the plurality of frame images composing the 4K photo movie. As described above, since an image (frame image) capturing a desired scene is clipped from a movie as a still image, the user does not have to be conscious of a shutter opportunity. Therefore, it possible to generate an image capturing a decisive moment, the generation of such an image being difficult in a conventional technique. That is, this configuration allows the user to easily take a picture capturing a happening or accident that can occur at any time or a picture capturing an instantaneous state of a subject (liquid, flame, or the like) whose state varies with time.

As each of the frame images composing the 4K photo movie is clipped as a still image, image quality of the frame images clipped as a still image has higher priority than integrity and image quality of a movie, in the 4K photo movie. Therefore, when the 4K photo mode is setted, settings related to capturing are automatically set as a setting unique to a photo movie mode suitable for recording still images (see, for example, Japanese Unexamined Patent Application Publication No. 2016-32214). For example, in a normal movie mode, an image quality setting (resolution) is set to a value designated by the user within a range of video graphics array (VGA) to 4K (4000 pixels*2000 pixels). In contrast, in the 4K photo mode, the image quality setting (resolution) is set to a value corresponding to the highest resolution among all configurable resolutions in the digital camera 100 for example, 4K or 6K). This setting allows a high-quality frame image to be recorded and allows a high-quality still image to be clipped.

[2-2. Still Image Selection Processing]

A description will be given of a selection screen for selecting a frame image to be clipped as a still image from a plurality of frame images composing a 4K photo movie.

Figure 4:
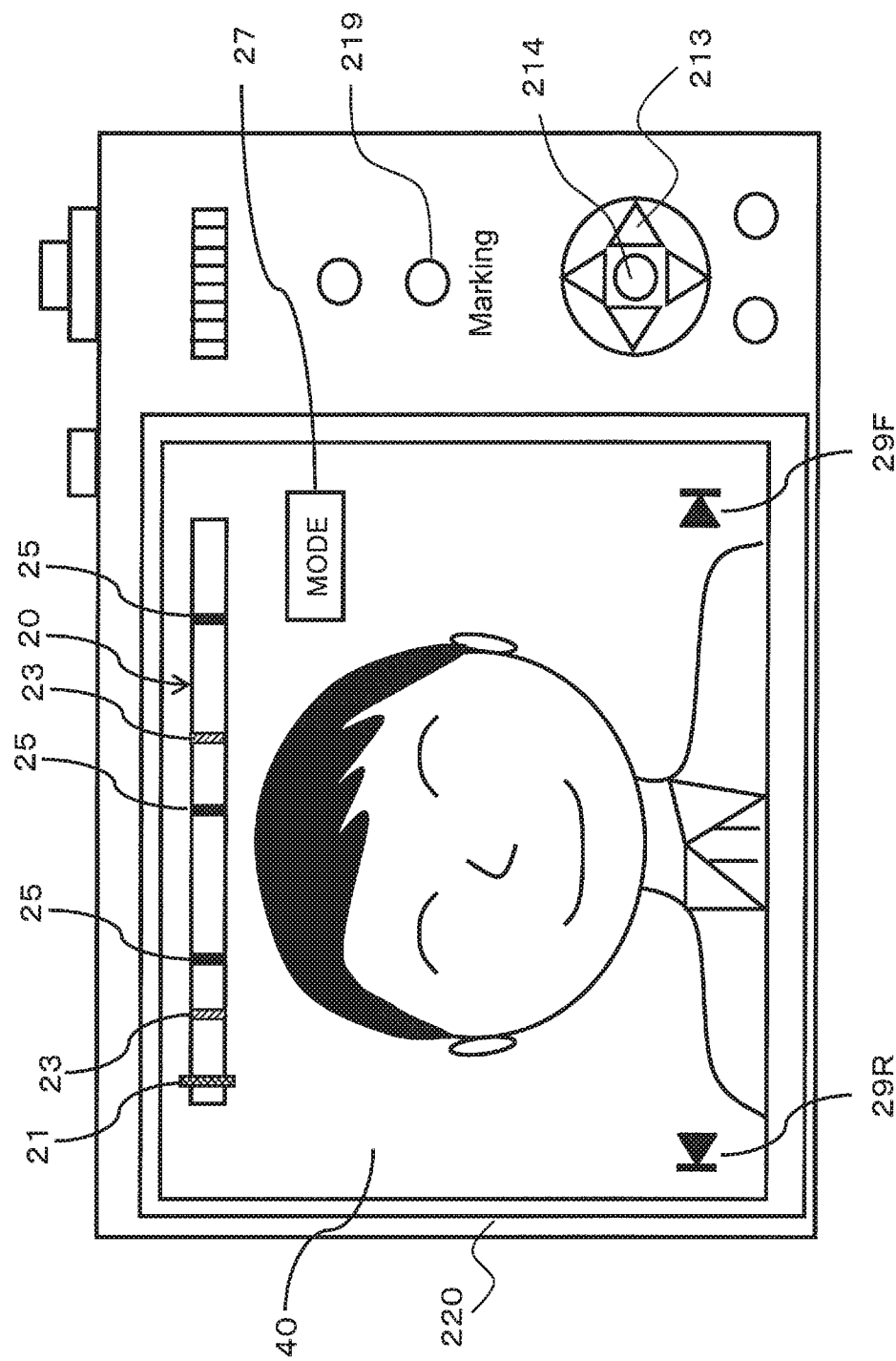
FIG. 4 is a diagram illustrating a display example (a first selection screen) of a selection screen of an image to be clipped.

FIG. 4 is a diagram showing a first selection screen for selecting a frame image to be clipped from a 4K photo movie. The first selection screen is displayed in response to a predetermined operation (for example, an operation on a predetermined button) that makes an instruction indicating a switch to a still image selection mode with a review image displayed immediately after completion of recording in the photo movie mode. Alternatively, the first selection screen is displayed in response to the predetermined operation that makes an instruction indicating a switch to the still image selection mode after a desired 4K photo movie is selected in the playback mode.

As shown in FIG. 4, on the first selection screen, one of frame images composing the 4K photo movie is displayed as a candidate image 40 (a still image). A slide bar 20 for roughly selecting a position where an image to be clipped lies is displayed on an upper side of the first selection screen.

A position on the slide bar 20 in a longitudinal direction corresponds to a position of each frame composing the 4K photo movie. A left end of the slide bar 20 corresponds to a frame position at a beginning of the 4K photo movie, and a right end corresponds to a frame position at an end of the 4K photo movie. The slide bar 20 includes a pointer 21 indicating a frame position of a frame image played back (displayed) as a candidate image to be clipped. Note that the user can manually move the pointer 21 (by a touch operation). The candidate image 40 to be displayed on the screen is changed in accordance with a position to which the pointer 21 has been moved.

As will be described later, the digital camera 100 has a function of giving a marker to a frame image in accordance with a user operation (hereinafter, referred to as "manual marking") and function of extracting a distinctive frame image and automatically giving a marker to the frame image extracted (hereinafter, referred to as "automatic marking"). Therefore, displayed on the slide bar 20 is a marker display 23 indicating a position (frame position) of the marker manually given by the user and a marker display 25 indicating a position (frame position) of a feature point (details will be described later) automatically extracted. The marker displays 23, 25 allows the digital camera 100 to promptly switch the candidate image 40 to a frame image indicated by the marker display and display the frame image, which increases convenience of the user when the user selects an image to be clipped. Details of the marking processing will be described later.

For example, the marker display 23, the marker display 25, and the pointer 21 are displayed with different colors, shapes, or patterns so as to be visually distinguished from each other.

On the first selection screen, skip buttons 29R, 29S for switching the candidate image 40 to an image lying at a frame position indicated by the marker display 23, 25 are displayed.

The user can operate the skip button 29R, 29F on the first selection screen to switch (skip) the candidate image 40 to an image lying at a frame position indicated by the marker display 23, 25.

That is, the controller 180 makes reference to marking information 50 and/or feature point information 55 to be described later, to identify a position of a marker lying before or after the currently displayed candidate image 40, and newly displays a frame image corresponds to the position of the marker identified. For example, when the user operates the skip button 29F, the controller 180 makes reference to the marking information 50 or the feature point information 55 to identify the position of the marker lying after the candidate image 40, and displays an image lying at a frame position indicated by the marker identified as the candidate image 40. When the user operates the skip button 29R, the controller 180 makes reference to the marking information 50 or the feature point information 55 to identify the position of the marker lying before the currently displayed frame image, and displays an image lying at a frame position indicated by the marker identified as the candidate image 40.

Instead of the skip button 29R, 29F, the user can operate the left or right direction button of the cursor button 213 to switch the candidate image 40 to an image indicated by the marker display 23, 25.

Alternatively, the user can directly the touch the marker display 23, 25 on the first selection screen to switch the candidate image 40 to an image lying at a frame position indicated by the marker display 23, 25 touched.

Such a marker manually or automatically given allows the candidate image 40 to be skipped to an image to which the marker is given. This configuration allows the user to find, in a short time, an image marked by the user himself or herself, a distinctive image extracted automatically, or an image lying in the vicinity of either of the images.

As described above, the user can roughly select a clipping position by skipping the position of the candidate image using the marker display 23, 25 of the slide bar 20 on the first selection screen. Thereafter, the user uses a thumbnail image displayed on the screen to select an image more minutely.

Figure 5:
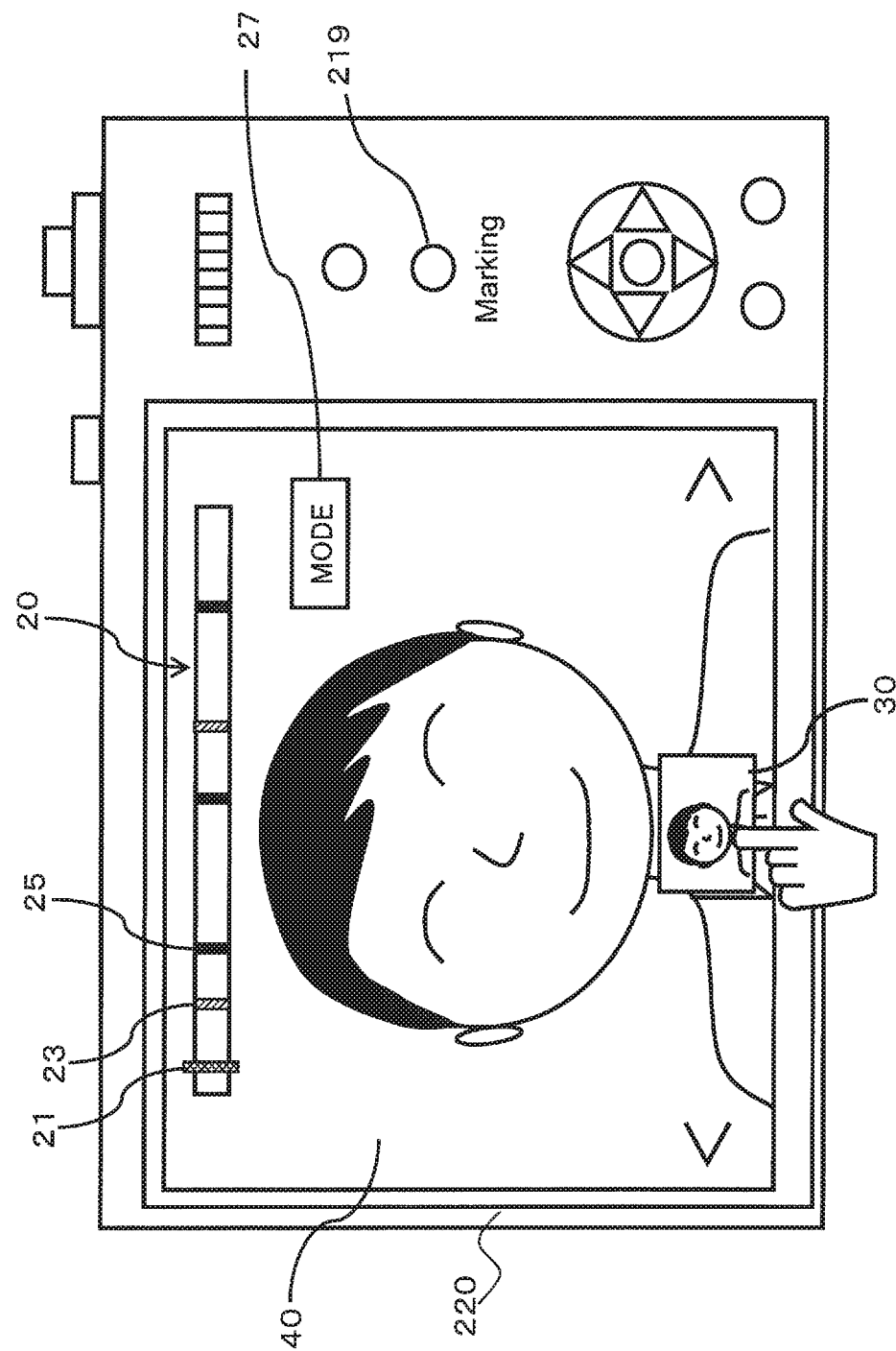
FIG. 5 is a diagram illustrating a display example (a second selection screen) of the selection screen of the image to be clipped.
Figure 6:
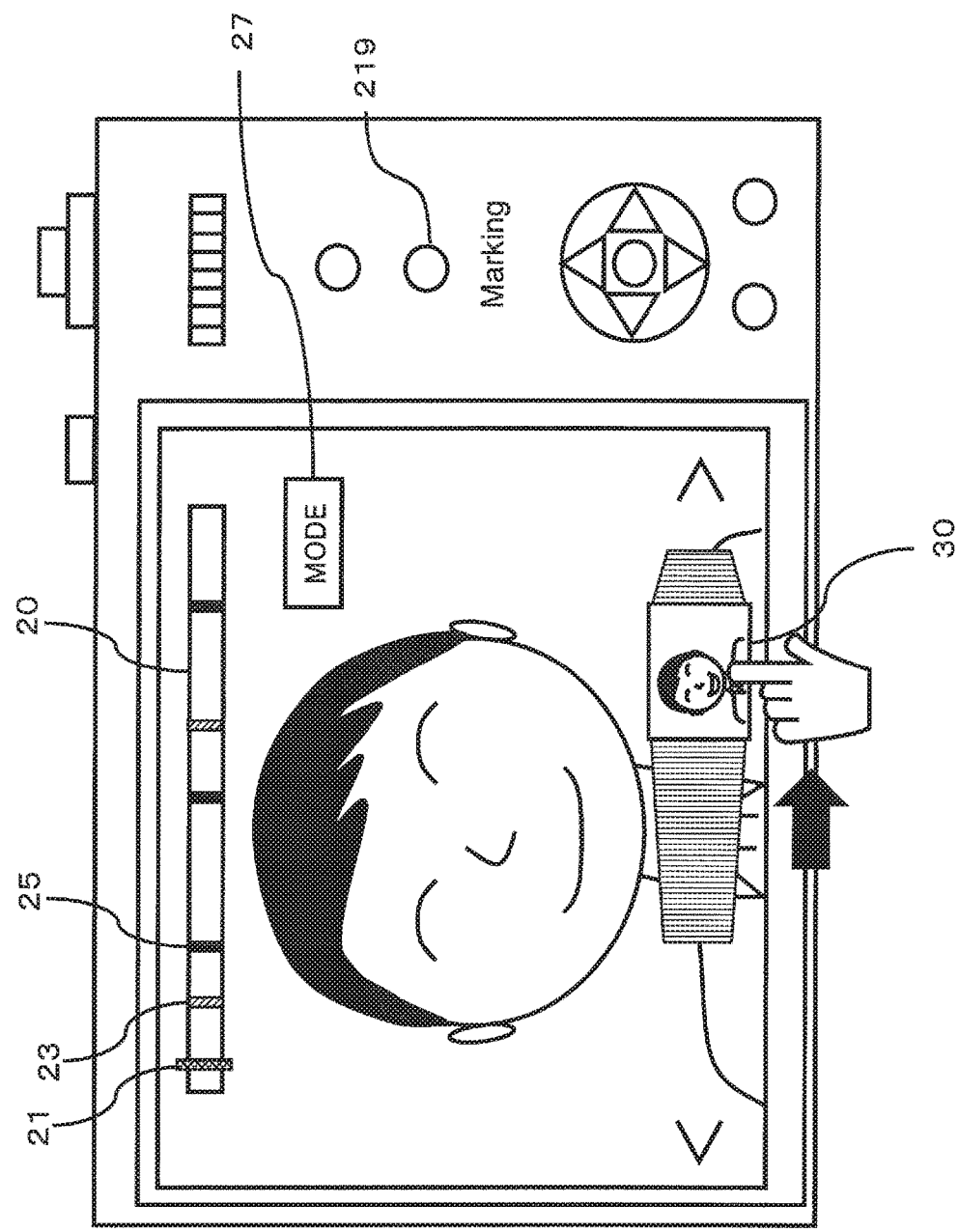
FIG. 6 is a diagram for describing an example of an operation on the second selection screen.

Specifically, when a predetermined operation button is operated with the first selection screen shown in FIG. 4 displayed, a transition is made to a second selection screen as shown in FIG. 5. On the second selection screen, a thumbnail image 30 for image selection is displayed at a bottom of the screen. A position in a horizontal direction of the thumbnail image 30 on the second selection screen corresponds to a frame position. When the user slides the thumbnail image 30 in the horizontal direction on the second selection screen, as shown in FIG. 6, the thumbnail image 30 is switched in accordance with the slide position (the frame position). On the first selection screen, the candidate image 40 is switched between the marked images, but on the second selection. Screen, the thumbnail image 30 is switched on a frame-by-frame basis in accordance with to the movement position. That is, on the second selection screen, a frame-by-frame playback is available.

When the thumbnail image 30 is slid to the right, a frame number increases in accordance with the position, and a thumbnail image 30 corresponding to a frame image having the frame number increased is displayed. Conversely, when the thumbnail image 30 is slid to the left, the frame number decreases and a thumbnail image 30 corresponding to a frame image having the frame number decreased displayed. That is, sliding the thumbnail image 30 to the right causes a thumbnail image 30 having a larger frame number to be displayed. Conversely, sliding the thumbnail image 30 to the left causes a thumbnail image 30 having a smaller frame number to be displayed. Terminating the touch on a desired thumbnail image 30 when the thumbnail image 30 is displayed causes the candidate image 40 corresponding to the thumbnail image 30 selected to be displayed.

Note that a range of images from which the user can select a scene (a frame) to be clipped on the second selection screen may be restricted to a certain range having the position of the candidate image 40 as a center, after the candidate image 40 is moved to a frame or a feature point to which the marker is given through a marker operation on the first selection screen. For example, the range may be restricted to a range of images lying in a predetermined time period (for example, ±1 second) having the position of the image being displayed as a center.

When the user pushes the determination button 214 with the candidate image 40 displayed on the first or second selection screen, the controller 180 clips the frame image corresponding to the candidate image 40 from the movie data and records the frame image in the memory card 200 as a still image.

As described above, the user roughly designate a position to be clipped through the marker operation on the first selection screen and then minutely sets a clipping position on a frame-by-frame basis on the second selection screen. This configuration allows the user to easily select a desired image to be clipped from the movie.

The digital camera 100 according to the present embodiment allows a change of a type of marker to be displayed on the slide bar 20 on the first and second selection screens. The change of the type of marker to be displayed on the slide bar 20 is made through a setting of a marking display mode.

Figure 7:
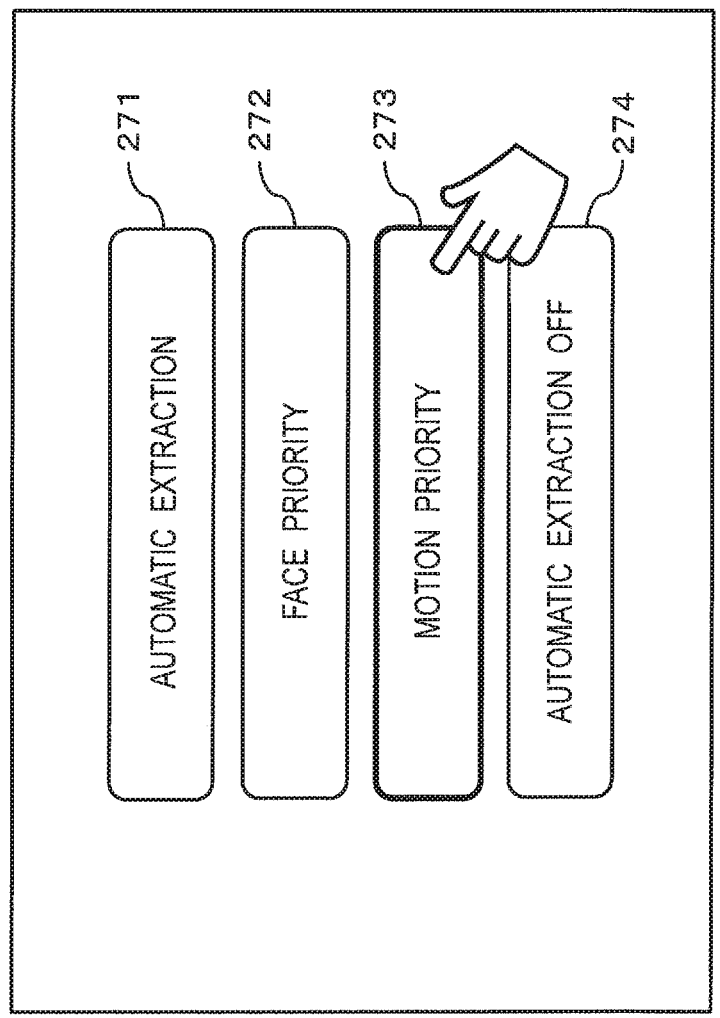
FIG. 7 is a diagram showing a screen for setting a marking display mode.
Figure 8:
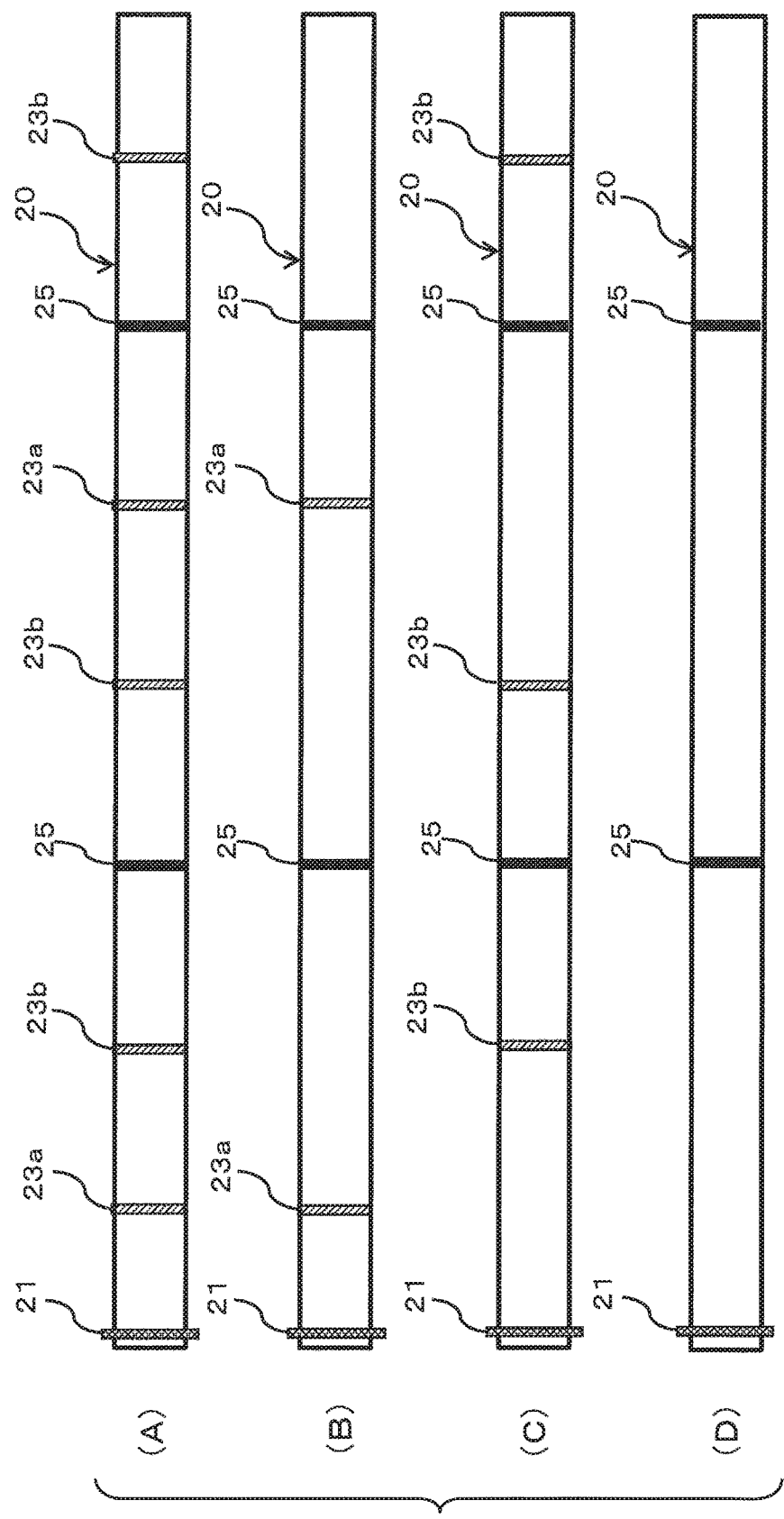
FIG. 8 is diagrams illustrating examples of marker displays in respective settings of the marking display mode.

FIG. 7 is a diagram showing a setting screen of the marking display mode. FIG. 8 is diagrams illustrating examples of the marker displays in respective settings of the marking display mode. When a MODE button 27 is pushed on the first or second selection screen, the setting screen of the marking display mode shown in FIG. 7 is displayed. When one of icons 271 to 274 is selected on the setting screen of the marking display mode, a mode corresponding to the icon selected is set.

In FIG. 7, the icon 271 is an icon for setting the marking display mode to a first mode in which a feature point automatically extracted based of face detection and/or motion of the subject are displayed in addition to the marker manually given by the user. For example, as shown in (A) of FIG. 8, in the first mode, the marker display 25 of the marker manually given by the user and the marker display 23*a*, 23*b* indicating the feature point automatically extracted based on the face detection and/or the motion of the subject are displayed on the slide bar 20. At this time, only up to 10 marker displays 23*a*, 23*b* are simultaneously displayed on the slide bar 20. Therefore, when the number of feature points registered in the feature point information 55 exceeds 10, 10 feature points having the top 10 scores are selected from among the feature points registered, and the marker displays 23*a*, 23*b* are displayed regarding the feature points selected.

The icon 272 is an icon for setting the marking display mode to a second mode in which the feature point automatically extracted based on the face detection is displayed in addition to the marker manually given by the user. For example, as shown in (B) of FIG. 8, in the second mode, the marker display 25 indicating the marker manually given by the user and the marker 23*a* indicating the feature point automatically extracted based on the face detection are displayed on the slide bar 20. At this time, only up to 10 marker displays 23*a* are simultaneously displayed on the slide bar 20. Therefore, when the number of feature points relating to the face detection registered in the feature point information 55 exceeds 10, 10 feature points having the top 10 scores are selected from among the feature points relating to the face detection, and the marker displays 23*a* are displayed regarding the feature points selected.

The icon 273 is an icon for setting the marking display mode to a third mode in which a feature point automatically extracted based on the motion of the subject is displayed in addition to the marker manually given by the user. As shown in (C) of FIG. 8, in the third mode, the marker display 25 indicating the marker manually given by the user and the marker display 23*b* indicating the feature point automatically extracted based on the motion of the subject are displayed on the slide bar 20. At this time, only up to 10 marker displays 23*b* are simultaneously displayed on the slide bar 20. Therefore, when the number of feature points relating to the motion of the subject registered in the feature point information 55 exceeds 10, 10 feature points having the top 10 scores are selected from among the feature points relating to the motion of the subject, and the marker displays 23*b* are displayed regarding the feature points selected.

The icon 274 is an icon for setting the marking display mode to a fourth mode in which only a marker manually given by the user is displayed. As shown in (D) of FIG. 8, in the fourth mode, only the marker display 25 indicating the marker manually given by the user is displayed on the slide bar 20, but the marker display 23*a*, 23*b* indicating the feature point automatically extracted is not displayed.

Note that, in the first to fourth modes, up to a predetermined upper limit number (for example, 40) of the marker displays 25 indicating the markers manually given by the user are also displayed on the slide bar 20.

[2-3. Marking Processing]

The digital camera 100 has a function (manual marking) of giving a marker to a frame image in accordance with a user operation performed during shooting of a 4K photo movie. The digital camera 100 further has a function (automatic marking) of extracting a distinctive frame image during shooting of the 4K photo movie and automatically giving a marker to the frame image extracted. Such marker allows the digital camera 100 to promptly display frame image to which the marker is given and to promptly present, to the user, a candidate image to be clipped.

[2-3-1. Manual Marking]

The manual marking is performed in response to an operation on a marking button 219 made by the user. When the marking button 219 is pushed by the user during recording of the 4K photo movie, a frame being recorded at the time of the push is marked. The frame marked serves as an index for searching for a frame to be clipped later by the user as a still image.

Figure 9:
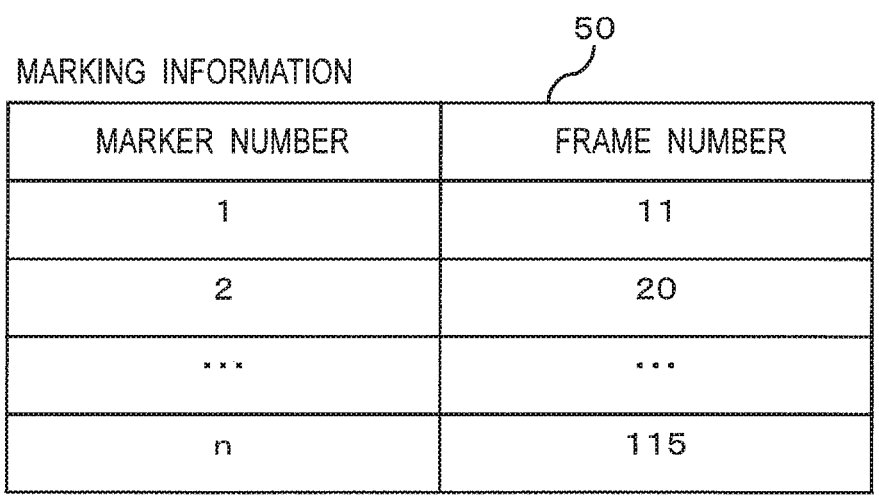
FIG. 9 is a diagram illustrating a structure of marking information.

When the marking button 219 is pushed, the controller 180 updates the marking information where the marking is managed. FIG. 9 is a diagram showing a structure of the marking information 50. In the marking information 50, a marker number and a frame number of a frame image taken when the marking is performed are managed with the marker number and the frame number associated with each other. The movie data includes a header and stream data, and the marking information 50 is stored in the header of the movie data.

[2-3-2. Automatic Marking]

During recording of the 4K photo movie, the controller 180 analyzes the movie taken, extracts a feature point in the movie, and marks the feature point extracted. Herein, the feature point corresponds to a frame image automatically extracted based on face detection and/or motion detection during shooting of the 4K photo movie. The feature point (that is, the frame image) may be a frame itself (a scene) that the user would like to clip or a frame in the vicinity of the frame that the user would like to clip. Specifically, the controller 180 detects an image capturing a human face or a frame image capturing a moving subject as the feature point and performs marking on such an image. It is expected that detecting the feature point based on the motion of the subject causes an image capturing a scene such as a moment where a bird flies away, a moment where a bird spreads his or her wings, or a moment close to each of the above moments to be extracted as the feature point. It is expected that detecting the feature point based on the face detection causes an image capturing a scene such as a moment where a person turns around, a moment where the person turns to the front, or a moment close to each of the above moments to be extracted as the feature point.

Figure 10:
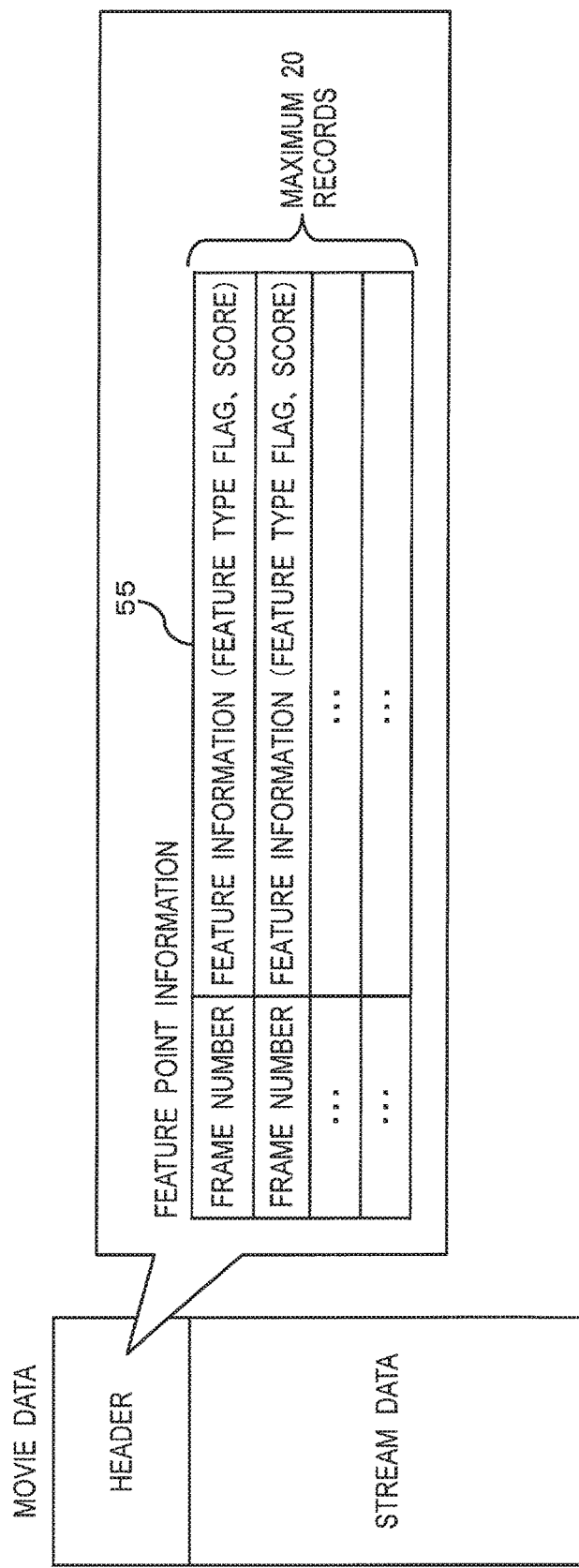
FIG. 10 is a diagram illustrating a structure of feature point information.

While a large number of feature points are extracted during shooting of a movie, up to 20 feature points are finally managed as feature point information associated with the 4K photo movie. FIG. 10 is a diagram illustrating a structure of the feature point information. The feature point information 55 is stored in the header of the movie data. The header includes fundamental information and private information, and the private information includes the feature point information 55. The feature point information 55 includes, for each feature point (that is, each frame image) extracted, a frame number of and feature information on the frame image from which the feature is extracted. The feature information includes a feature type flag indicating whether the feature point is extracted based on the face detection or the motion of the subject, and a score of the feature point extracted.

Figure 11:
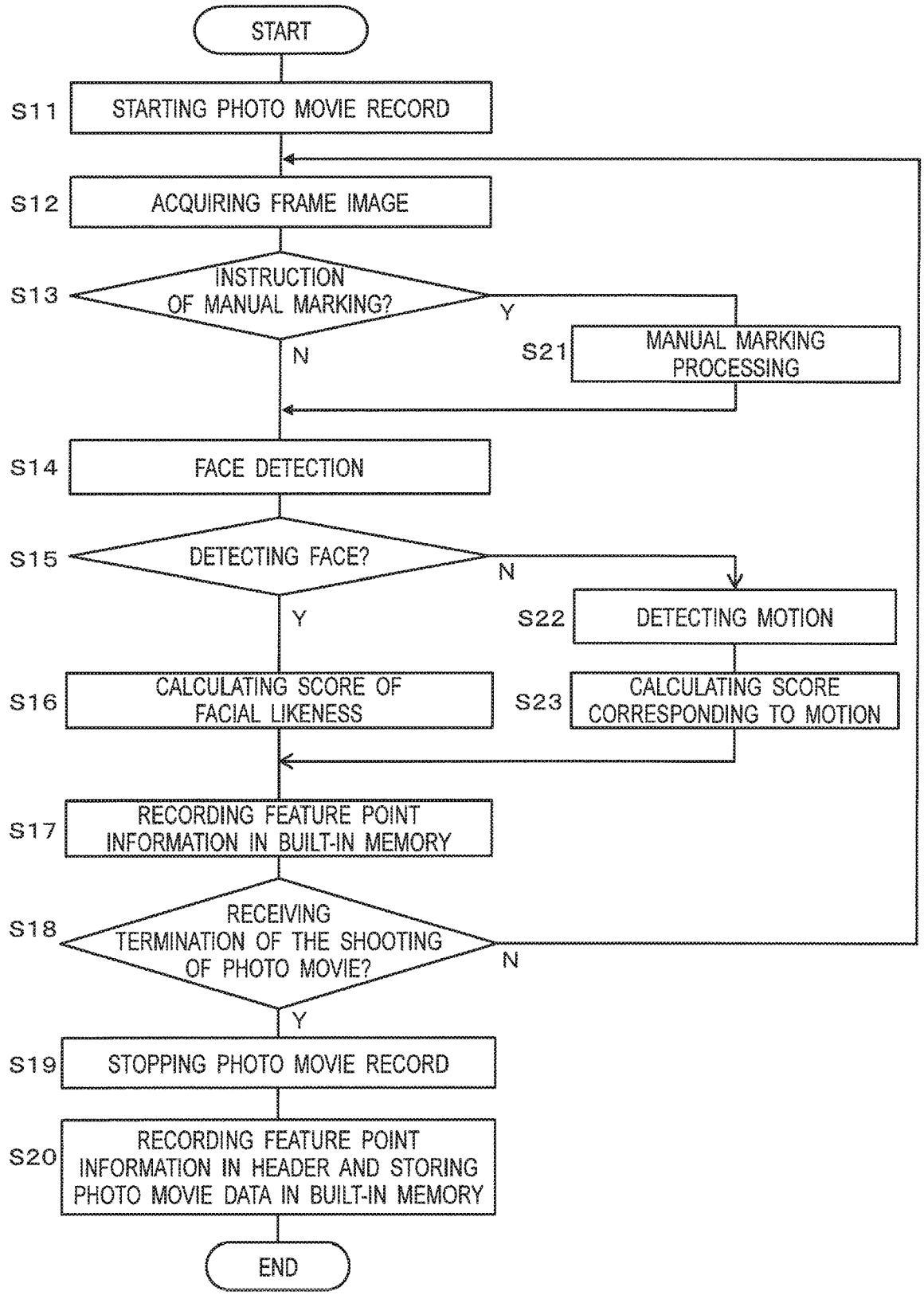
FIG. 11 is a flowchart of generation processing of the feature point information.

FIG. 11 is a flowchart of generation processing of the feature point information 55 performed by the controller 180 of the digital camera 100. A description will be given of the generation processing of the feature point information 55 with reference to FIG. 11.

When shooting of the 4K photo movie is started in accordance with a user operation in the digital camera 100 (S11), the controller 180 acquires a frame image generated by the COD 140 and subjected to predetermined processing (S12). A determination is made whether an instruction indicating the manual marking is made by the user (S13). When the instruction indicating the marking is made by the user (YES in S13), the controller 180 performs the marking processing (S21). Specifically, as shown in FIG. 9, the frame number of the current frame is registered in the marking information 50. When no instruction indicating the marking is made (NO in S13), no marking processing is performed.

Next, the controller 180 performs face detection processing on the frame image acquired (S14). When a face is detected (YES in S15), the controller 180 calculates a point (a score) indicating a facial likeness for each frame (S16). The score corresponding to the facial likeness calculated in consideration of presence or absence of a face, a size of the face, a position of the face (located at a center or on a periphery), an inclination of the face, and the like. For example, with a score corresponding to the presence or absence of a face having three levels of 0, 20, and 40, a score corresponding the size of a face having three levels of 0, 15, 30, and a score corresponding the position of a face having three levels of 0, 15, 30, a total score may be calculated by the following expression:

Total score=the score corresponding to the presence or absence of a face+the score corresponding to the size of a face+the score corresponding to the position of a face.

In contrast, when no face is detected (NO in S15), the controller 180 detects the motion of the subject (S22). Then, a score corresponding to the motion is calculated for each frame (S23). Specifically, the motion of the subject between frames is determined based on a magnitude of a difference value (a motion vector) between adjacent frames by motion detection. Once a region having motion is detected, the motion vector is determined between a frame before the frame where the region having motion has been detected and the subsequent frames. In this way, it is estimated that a frame having a maximum motion vector among the consecutive frames is a frame in which a screen occupancy rate of a region having motion becomes maximum. A score having five levels (0, 25, 50, 75, 100) is set in accordance with a magnitude of this motion. As described above, the score corresponding to the motion of the subject is calculated for each frame.

Then, the feature point information is recorded in the built-in memory 240 based on the score calculated for a target frame (S17). That is, as shown in FIG. 10, the frame number and the feature information (the feature type flag, the score) are recorded, as the feature point information for each frame image, with the frame number and the feature information associated with each other. However, when frame numbers to which scores are given are consecutive, feature point information corresponding to the frame number having the highest score among the consecutive frame numbers is recorded in the built-in memory 240 as representative information.

Figure 12:
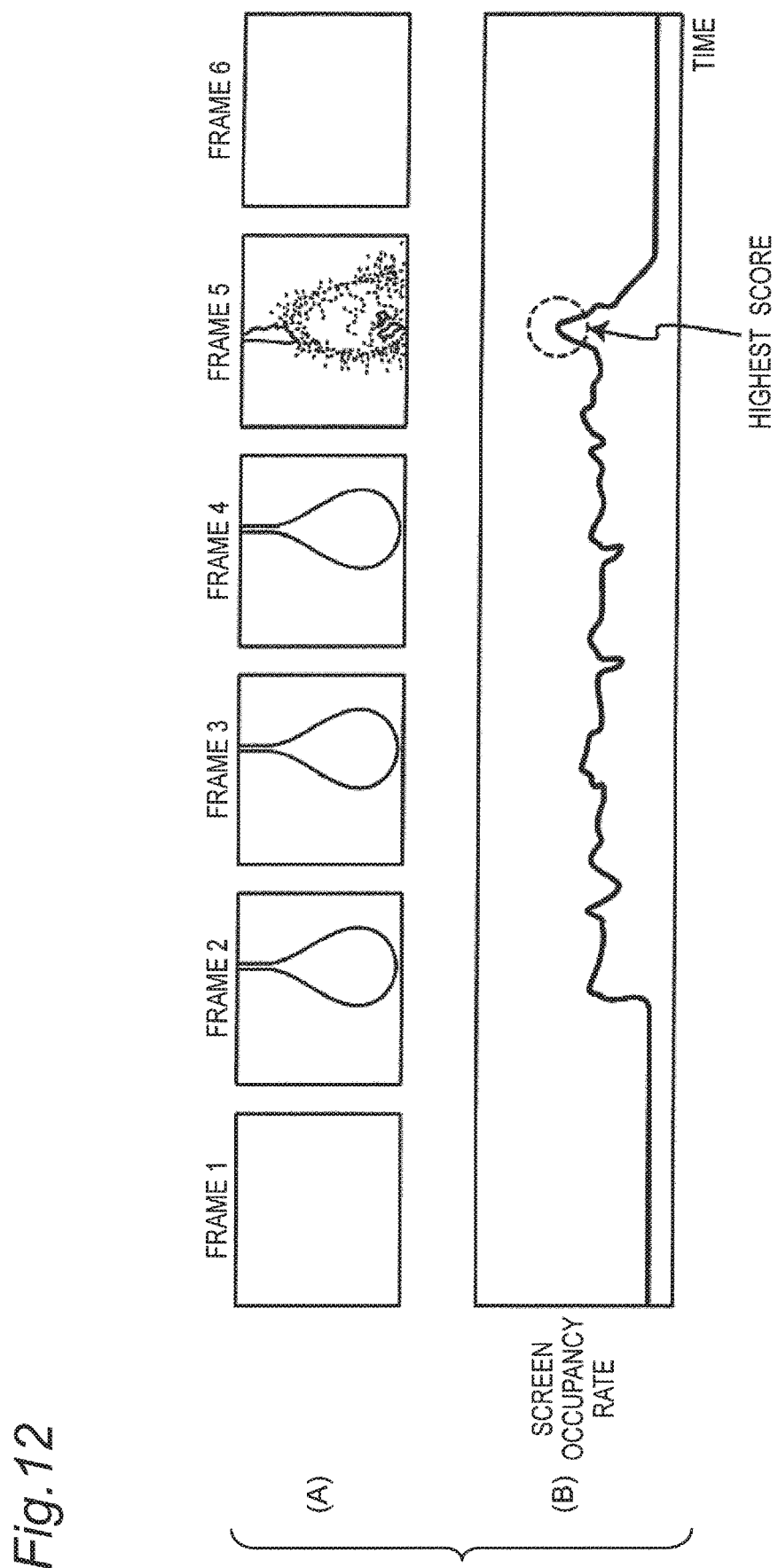
FIG. 12 is diagrams for describing an example of a method of selecting a feature point to be registered in the feature point information.

For example, FIG. 12 is diagrams showing an example of shooting of a 4K photo movie that captures a burst of a balloon. (A) of FIG. 12 shows frame images. (B) of FIG. 12 shows a screen occupancy rate of a certain region having motion in a frame image on a vertical axis and a time on a horizontal axis. As shown in FIG. 12, the screen occupancy rate is detected over a predetermined period (four frames in this example). In this example, scores are given to frames 2 to 5, but as described above, what is recorded as representative information in the built-in memory 240 is feature point information corresponding to the frame 5 having the highest score. As described above, the restriction where the feature point information is given only to a representative frame position when a predetermined feature is detected within a certain period prevents many pieces of feature point information from being unnecessarily given to a scene expected to be clipped as a still image.

The controller 180 determines whether an instruction indicating termination of the shooting of the 4K photo movie has been received (S18). When the instruction indicating termination of the shooting has not been received (NO in S18), the controller 180 repeats the above-described processing (S12 to S18, S21, S22 to S23).

The controller 180 determines whether the instruction indicating termination of the shooting of the 4K photo movie has been received (S18). When receiving the instruction indicating termination of the shooting of the 4K photo movie (YES in S18), the controller 180 stops recording of the 4K photo movie (S19). Then, the controller 180 records the feature point information stored in the built-in memory 240 in the header of the image data of the 4K photo movie and records the image data of the 4K photo movie in the memory card 200 (S20). At this time, 20 records having the top 20 scores are selected from among all pieces of the feature point information stored in the built-in memory 240, and the pieces of feature point information selected are recorded as the feature point information 55 in the header of the image data of the 4K photo movie. This configuration can put restrictions on the number of pieces of feature point information 55 to be eventually recorded in the header. Putting the two restrictions as described above prevents many meaningless markers from being displayed on a small screen of the display monitor 220.

As described above, when the user makes an instruction indicating the manual marking during recording of the 4K photo movie, marking is performed on not only a frame (or a frame in the vicinity thereof) taken when the instruction is made, but also a feature point (a distinctive frame) automatically extracted.

Note that, in step S20, a feature point to be recorded as the feature point information 55 may be extracted from all the feature points recorded in the built-in memory 240 as follows.

Figure 13:
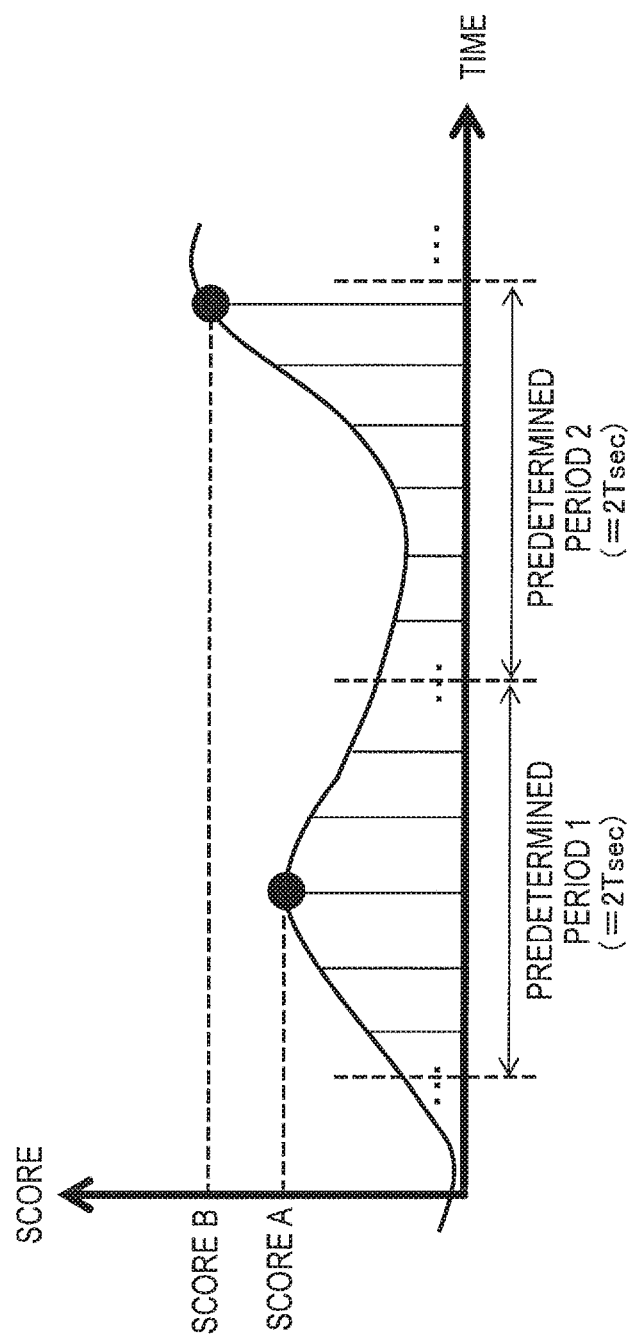
FIG. 13 is a diagram for describing another example of the method of selecting a feature point to be registered in the feature point information.

For example, it is assumed that, after moving the candidate image 40 to a frame to which the marker is given on the first selection screen, the range of images from which the user can select a scene (a frame) to be clipped corresponds to a range of images lying in ±T second period having the position of the candidate image 40 after the movement as a center. In this case, as shown in FIG. 13, in a predetermined period (an interval of 2 T seconds), the maximum score among the scores calculated for each frame is extracted as a recording candidate. Then, up to 20 recording candidates having the top 20 scores may be selected in descending order from among recording candidates extracted in each period and recorded as the feature point information 55. For example, in a predetermined period 1, a feature point having a score A is selected, and in a predetermined period 2, a feature point having a score B is selected. This configuration reduces the number of markers and prevents many markers from being meaninglessly displayed.

[3. Effects and Other Benefits]

The digital camera 100 of the present embodiment is an information processing apparatus that generates still image data from 4K photo movie data (an example of movie data). The digital camera 100 includes the display monitor 220 (an example of a display unit or a display), the operation unit 210 (an example of an operation unit or an operation receiver) that receives an instruction from a user, the storage unit (an example of a storage including the memory card 200, the built-in memory 240, the buffer 170, and the like) that stores 4K photo movie data, and the controller 180 (an example of a controller) that causes the display monitor 220 to display the selection screen (see FIGS. 4 and 6) for selecting a frame image to be stored as a still image from the movie data. The candidate image 40 that is displayed as a candidate for a frame image to be selected is displayed on the selection screen. In a plurality of frames composing the movie data, the marker display 25 (an example of first marker information) indicating the position of a frame marked by the user and the marker display 23 (an example of second marker information) indicating the position of a frame marked automatically based on the predetermined feature are also displayed on the selection screen. When the operation unit 210 receives an instruction indicating a switch of the candidate image 40, the controller 180 moves the frame position of the candidate image based on the position indicated by the marker display 23, 25.

This configuration allows the candidate image to be promptly moved to the frame marked manually by the user or the frame automatically extracted on the selection screen of the still image, which increases convenience of the user when the user selects a still image to be clipped from a movie. In addition, a distinctive frame is automatically extracted and marked, which eliminates the labor for marking work and increases convenience.

Further, the MODE button 27 (an example of the operation unit or the operation receiver) receives an instruction indicating selection of the type of the marker display 23, 25 to be displayed on the selection screen (see FIGS. 7 and 8). This configuration allows the user to set the type of marker (automatic, face priority, motion priority, automatic off (manual only)) to be displayed on the selection screen in accordance with preference of the user.

Further, the marker display 23 and the marker display 25 are displayed in a manner (color, shape, pattern) that makes the marker display 23 and the marker display 25 visually distinguishable from each other. This allows the user to recognize each of the markers.

Further, on the selection screen, the pointer 21 (an example of playback position information) indicating the frame position of the candidate image 40 and the slide bar 20 (an example of time axis information) provided corresponding to the time axis of the movie data are further displayed. The pointer 21, the marker display 23, and the marker display 25 are arranged and displayed on the slide bar 20.

Further, when the predetermined feature is detected within the certain period, the marker display 23 is given only to the representative frame position. This configuration prevents many pieces of the feature point information from being unnecessarily given to a scene expected to be clipped as a still image.

Further, the marker display 23 is given to one frame selected from a group of frames automatically detected based on the predetermined feature in each predetermined period (2 T) (see FIG. 13). Giving only one marker display 23 in each predetermined period prevents many markers from being meaninglessly displayed.

Further, the maximum number of marker displays 23 simultaneously displayed on the selection screen is limited to a predetermined value or a set value (for example, 10). This configuration prevents many marker displays from being displayed on the small selection screen and prevents the selection screen from being difficult to be seen.

Another Embodiment

As described above, the first embodiment has been described as an example of the technique disclosed in the present application. However, the technique according to the present disclosure is not limited to the first embodiment and is applicable to embodiments in which changes, replacements, additions, omissions, and the like are made as appropriate.

In the above-described embodiment, a feature point (a distinctive frame image) is extracted based on a feature of face detection and motion of a subject, but an image feature is not limited to such a feature, and the feature point may be extracted based on other kinds of feature.

In the above-described embodiment, two screens are prepared, as the selection screens, the two screen including the first selection screen for a skip of the candidate image and the second selection screen for frame-by-frame playback of the candidate image. However, the skip of the candidate image and the frame-by-frame playback of the candidate image may be performed on one selection screen. In this configuration, an operation unit for the skip of the candidate image and an operation unit for the frame-by-frame playback of the candidate image may be separately provided.

According to a first aspect of the present disclosure, there is provided a first information processing apparatus configured to generate still image data from movie data. The first information processing apparatus includes a display unit, an operation unit configured to receive an instruction from a user, a storage unit configured to store movie data, and a controller configured to cause the display unit to display a selection screen for selecting a frame image to be stored as a still image from the movie data. On the selection screen, a candidate image that is displayed as a candidate for a frame image to be selected, and first marker information indicating a position of a frame marked by the user and second marker information indicating a position of a frame marked automatically based on a predetermined feature in a plurality of frames composing the movie data are displayed. The controller moves, when the operation unit receives an instruction indicating a switch of the candidate image, a frame position of the candidate image based on the position indicated by either the first marker information or the second marker information.

The information processing apparatus of the present disclosure achieves an increase in convenience of a user when the user selects a frame image to be clipped from among a plurality of frame images composing a movie.

In the above-described embodiment, digital camera has been described as the information processing apparatus, but the information processing apparatus of the present disclosure may be other electronic apparatuses. For example, the information processing apparatus may be any apparatus capable of processing image data such as a personal computer, a video camera, a smartphone, or tablet terminal.

The embodiment has been described above as an example of the technique according to the present disclosure. For the description, the attached drawings and the detailed description have been provided.

Therefore, the components shown in the attached drawings and the detailed description may include not only essential components for the solution to the problem but also components not essential for the solution to the problem for illustrating the technique. Thus, it should not be immediately deemed that, merely based on the fact that the components that are not essential are shown in the attached drawings and the detailed description, the components that are not essential are essential.

Further, since the above-described embodiment is provided to illustrate the technique according to the present disclosure, various changes, replacements, additions, omissions, or the like can be made within the scope of the claims or of their equivalents.

The idea of the present disclosure is applicable to an information processing apparatus capable of generating still image data from movie data.

Obviously, numerous modifications and variations of the present invention are possible in light of the above teachings. It is therefore to be understood that within the scope of the appended claims, the invention may be practiced otherwise than as specifically described herein.

What is claimed is:

1. An information processing apparatus comprising:
a display;
an operation receiver to receive an instruction indicating a switch of a candidate image from a user;
a storage to store movie data from which still image data is generated; and
a controller to
control the display to display a selection screen via which a frame image to be stored as a still image is selected from the movie data, the selection screen including
the candidate image that is displayed as a candidate for a frame image to be selected,
first marker information indicating a position of a frame marked during video shooting by the user in a plurality of frames composing the movie data,
second marker information indicating a position of a frame marked automatically based on a feature in the plurality of frames composing the movie data, and
a user interface for selecting whether or not to display the first marker information on the selection screen; and
move a frame position of the candidate image based on the position indicated by the first marker information or the second marker information in a case where the operation receiver receives the instruction;
wherein the first marker information and the second marker information are displayed in a manner that makes the first marker information and the second marker information visually distinguishable from each other.

2. The information processing apparatus according to claim 1, wherein
the selection screen further includes playback position information indicating the frame position of the candidate image and time axis information provided corresponding to a time axis of the movie data, and
the playback position information, the first marker information, and the second marker information are arranged and displayed on the time axis information.

3. The information processing apparatus according to claim 1, wherein
the second marker information is given only to a representative frame position in a case where the feature is detected within a certain period.

4. The information processing apparatus according to claim 1, wherein
the second marker information is given to one frame selected from a group of frames automatically detected based on the feature in each period.

5. The information processing apparatus according to claim 1, wherein
a maximum number of pieces of the second marker information simultaneously displayed on the selection screen is limited to a set value.

* * * * *